(12) United States Patent
Beiderbeck et al.

(10) Patent No.: US 11,482,101 B2
(45) Date of Patent: Oct. 25, 2022

(54) METHOD FOR GENERATING A VISUAL RANGE COLLECTION AND VISUAL RANGE COLLECTING DEVICE

(71) Applicant: Continental Automotive GmbH, Hannover (DE)

(72) Inventors: Martin Beiderbeck, Schwalbach a. Ts. (DE); Franz Pellkofer, Schwalbach a. Ts. (DE); Friedrich Graf, Schwalbach a. Ts. (DE)

(73) Assignee: Continental Automotive GmbH, Hannover (DE)

( * ) Notice: Subject to any disclaimer, the term of this patent is extended or adjusted under 35 U.S.C. 154(b) by 296 days.

(21) Appl. No.: 16/754,000

(22) PCT Filed: Oct. 15, 2018

(86) PCT No.: PCT/EP2018/078032
§ 371 (c)(1),
(2) Date: Apr. 6, 2020

(87) PCT Pub. No.: WO2019/076796
PCT Pub. Date: Apr. 25, 2019

(65) Prior Publication Data
US 2020/0242923 A1    Jul. 30, 2020

(30) Foreign Application Priority Data
Oct. 19, 2017 (DE) .................... 10 2017 218 726.3

(51) Int. Cl.
*G08G 1/01* (2006.01)

(52) U.S. Cl.
CPC ......... *G08G 1/0141* (2013.01); *G08G 1/0112* (2013.01)

(58) Field of Classification Search
CPC .. G06F 16/909; G08G 1/0112; G08G 1/0129; G08G 1/0141
See application file for complete search history.

(56) References Cited

U.S. PATENT DOCUMENTS

| 2004/0248521 A1 | 12/2004 | Moursund et al. |
| 2015/0344033 A1 | 12/2015 | Fukuda et al. |
| 2016/0167565 A1* | 6/2016 | Foltin ............... B60Q 1/143 315/82 |

FOREIGN PATENT DOCUMENTS

| CN | 102646287 | 8/2012 |
| CN | 105513423 | 4/2016 |

(Continued)

OTHER PUBLICATIONS

Office Action dated Aug. 18, 2021 issued in Chinese Patent Application No. 201880066657.4.

(Continued)

*Primary Examiner* — Fekadeselassie Girma
*Assistant Examiner* — Rajsheed O Black-Childress
(74) *Attorney, Agent, or Firm* — Cozen O'Connor

(57) ABSTRACT

A method for generating a visual range collection includes determining a current position of at least one motor vehicle, determining a current visual range which describes how far a driver of the motor vehicle can see from the current position, transmitting the visual range from the motor vehicle to a visual range collecting device, generating the visual range collection based on the transmitted visual range, predetermining an expected change in visual obstruction at the position, and adjusting the visual range from the visual range collection based on the predetermined change in visual obstruction.

15 Claims, 1 Drawing Sheet

(56) References Cited

FOREIGN PATENT DOCUMENTS

| | | |
|---|---|---|
| CN | 105539272 | 5/2016 |
| CN | 105691285 | 6/2016 |
| CN | 105835753 | 8/2016 |
| CN | 106169011 | 11/2016 |
| DE | 10017840 | 10/2001 |
| DE | 10149768 | 4/2003 |
| DE | 102006062061 | 7/2008 |
| DE | 102009011866 | 9/2010 |
| DE | 102010038970 | 2/2012 |
| DE | 102014225517 | 6/2016 |
| DE | 102015206335 | 10/2016 |
| DE | 102015206355 | 10/2016 |
| DE | 102015015944 | 6/2017 |
| EP | 0691534 | 1/1996 |
| JP | 2005-216624 | 8/2005 |
| WO | WO 2016151638 | 9/2016 |

OTHER PUBLICATIONS

Office Action for the corresponding German Patent Application No. 10 2017 218 726.3.
Hermann, Winner et al. "Handbuch Fahrerassistenzsysteme" ISBN 978-3-658-05733-6, Jan. 1, 2015.
Office Action dated May 28, 2021 issued in European Patent Application No. 18793371.8.

* cited by examiner

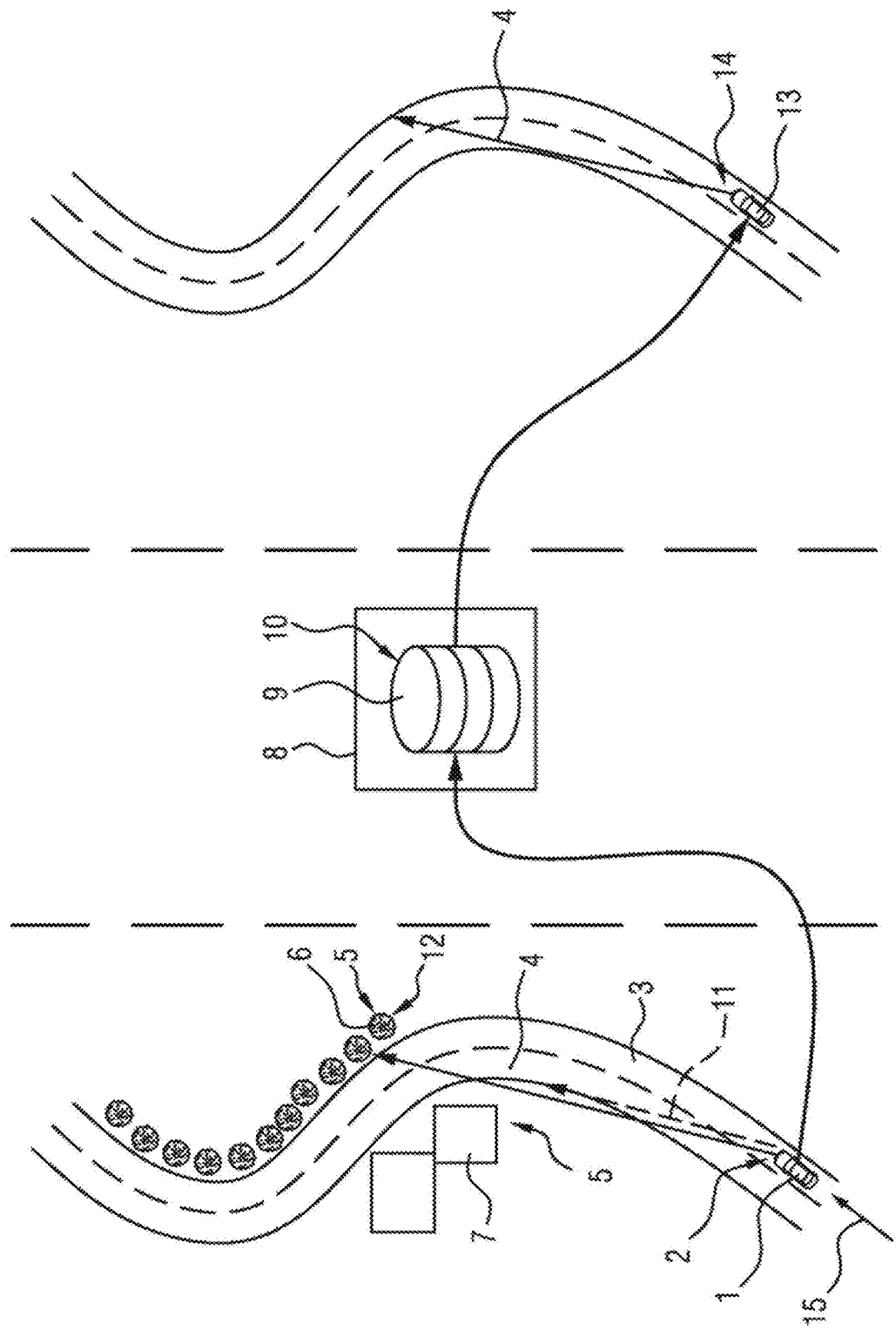

METHOD FOR GENERATING A VISUAL RANGE COLLECTION AND VISUAL RANGE COLLECTING DEVICE

CROSS REFERENCE TO RELATED APPLICATIONS

This is a U.S. national stage of Application No. PCT/EP2018/078032 filed Oct. 15, 2018. Priority is claimed on German Application No. DE 10 2017 218 726.3 filed Oct. 19, 2017 the content of which is incorporated herein by reference.

BACKGROUND OF THE INVENTION

1. Field of the Invention

The invention relates to a method for generating a visual range collection. A current position of at least one motor vehicle is determined. Furthermore, the invention relates to a visual range collecting device with a correspondingly generated visual range collection.

2. Description of Related Art

It is known that visual ranges are calculated from map data. The visual range is usually specified in terms of how far a roadway can be seen. The visual range can be limited, for example, by obstacles. An overtaking assistant of a motor vehicle is usually supported by the visual range calculated from the map data.

It is disadvantageous, however, that the visual ranges calculated from the map data do not always correspond to reality and the overtaking assistant is therefore only supported inaccurately.

SUMMARY OF THE INVENTION

It is an object of one aspect of the present invention to provide a method and a visual range collecting device in which or with which a visual range collection can be provided more precisely.

In a method according to one aspect of the invention, a visual range collection is generated. The following steps are carried out:

Determining a current position of at least one motor vehicle;

Determining a current visual range, which describes how far a driver of the motor vehicle can see a road ahead, at the current position;

Transmitting the visual range from the motor vehicle to a visual range collecting device;

Generating the visual range collection on the basis of the transmitted visual range;

Predetermining an expected change in visual obstruction at the position; and

Adjusting the visual range from the visual range collection on the basis of the predetermined change in visual obstruction.

One aspect of the invention is based on the realization that a visual range collection generated with sensor data of a motor vehicle is more accurate than a known visual range collection generated on the basis of map data. Furthermore, one aspect of the invention is based on the realization that visual ranges change over time, for example due to natural vegetation or due to human intervention, and the visual range collection should therefore be regularly adjusted in order to be able to continue to provide accurate information about the visual ranges. The change in the visual range can be predetermined by the expected change in visual obstruction. For example, previous knowledge can be used to determine the season or time of day when vegetation changes. Previous knowledge can also be used, for example, to determine when a construction site will be started at a specific position. It can then be assumed that a building will be rebuilt there within a predeterminable period of time and that this will result in a change in visual obstruction. However, it can also be the case, for example, that a building is demolished and a change in the visual obstruction ceases to exist or the construction site is terminated.

The current visual range is determined, for example, by an environment sensor of the motor vehicle and then transmitted, in particular wirelessly, from the motor vehicle to the visual range collecting device, for example a server external to the vehicle. The visual range collection is then generated, for example, in the visual range collecting device on the basis of the transmitted visual range. The visual range collection is available, in particular, as a database. The expected change in the visual obstruction at the position is predetermined based at least in part on previous knowledge, for example about a known change in the visual obstruction dependent on the vegetation cycle. The visual range with the visual range collection is then adjusted with this predetermined change in the visual obstruction.

In a further implementation, visual range information is generated using algorithms and data from the database and other databases. For example, certain plants grow according to rules, which results in visual obstruction. The view in winter is also predictable depending on the foliage. These rules can be mapped in specific models that also use data from weather databases. The uploaded volume of data of the sensor data can thus be reduced. Data from other databases can also be used, e.g. from offices (digital land registers) or other sensor platforms such as drones. This produces more stable and more reliable information, which is very important for safety-related processes such as overtaking. The volume of data to be transferred is effectively reduced. Buildings can be stored as 3D models, permitting the visual range to be determined more precisely depending on a direction of travel. The determination can also be carried out by algorithms that are calculated on the backend.

It is also advantageous that the visual ranges calculated from the map data can be validated. Routes not previously recorded can then also be recorded using the method according to the invention.

The visual range collection with the increased accuracy is particularly advantageous for use in at least semi-autonomous driving or in assisted driving.

It is preferably provided that a change in vegetation at the position is predetermined as the change in visual obstruction and the visual range in the visual range collection is adjusted based at least in part on the change in vegetation. The change in vegetation can be determined, for example, by evaluating known vegetation cycles. For example, it is known that deciduous trees produce leaves in the spring and lose leaves in the fall. For example, the height which e.g. a corn field, which can be a visual obstruction, has at which particular time viewed over the entire vegetation cycle is also known. For example, shortly after sowing and after harvesting, the corn is usually not a visual obstruction, while shortly before the harvest the corn can constitute a considerable visual obstruction. The specific vegetation, which is currently located at the current position, for example, can also be detected, for example, by the environmental sensors of the motor vehicle, or else can be read out by remote sensing data, or simply from databases. For example, it is customary for a farmer to indicate which crop will be grown in a particular field this season in order to apply for subsidy payments. This data can be read out, for example, from databases of, for example, EU authorities.

By taking the change in vegetation into account, the visual range collection is generated more accurately.

Furthermore, it is preferably provided that a change in the building density at the position is predetermined as a change in the visual obstruction and the visual range in the visual range collection is adjusted on the basis of the change in the building density. For example, a newly built building or else a demolished building can be described by the change in building density. However, the change in building density can, for example, also relate to a construction project on the road network, such as, for example, a new bridge or else a new underpass. The change in building density can also be retrieved, for example, from a database provided by the responsible construction authority. For example, the progress of the construction or else at least a start of construction and a planned end of construction date can therefore also be regularly specified in the database. The visual range collection can be generated with more precise visual ranges on the basis of the change in building density.

Furthermore, it is preferably provided that a quality value for the visual range is determined, which quality value describes a current environmental status of the motor vehicle while the visual range has been determined, and the quality value is stored with the visual range in the visual range collection. The quality value indicates as it were a quality level of the determined visual range. The quality value includes, for example, a time of day, brightness and/or the weather. The quality value allows a weather-dependent factor, for example fog, rain, in particular heavy rain, sun and/or dusk, to be used for later correction of the visual range, for example in the motor vehicle or in the visual range collecting device. The later correction is in particular synonymous with the adjustment of the visual range as already described. The quality value can be present, for example, as a scalar, which is composed of various weighted values which describe the environmental status.

Furthermore, it is preferably provided that the visual range of the visual range collection is replaced by a further visual range depending on the quality value. The further visual range is preferably a younger visual range than the visual range in the visual range collection. The visual range is then preferably replaced only by the further visual range if the further visual range has a quality value which is above a quality limit value. according to one aspect of the invention, the time interval between the determination of the visual range and the determination of the further visual range is weighted and the quality value is weighted. A combination of the time interval and the quality value can then be used to decide whether the further visual range replaces the visual range. For example, it may be preferable to keep the older visual range if the younger visual range has a significantly lower or worse quality value.

It is preferably provided that the adjusted visual range is transmitted from the visual range collection to another motor vehicle. For example, the adjusted visual range can therefore be transmitted wirelessly, in particular with a mobile radio network, from the visual range collecting device to the further motor vehicle. The further motor vehicle can then use the visual range that is more accurate by virtue of the adjustment. For example, the further motor vehicle can use the adjusted visual range for a driver assistance system or else for at least semi-autonomous or piloted driving.

In particular, it is provided that the visual range collection with respective visual ranges is generated by a swarm of vehicles with a plurality of motor vehicles. The generation of the visual range collection with the swarm of vehicles permits the visual range collection to be generated faster and more accurately. The vehicles of the swarm of vehicles can, for example, be networked with one another, but at least the vehicles of the swarm of vehicles are preferably coupled to the visual range collecting device or are at least designed to transmit the determined visual range to the visual range collecting device.

Furthermore, it is preferably provided that the visual range in the visual range collection is adjusted by machine learning. The respective visual range is preferably transmitted by the swarm of vehicles to the visual range collecting device and adjusted based at least in part on the change in visual obstruction using a self-learning system based on data analysis methods, for example transformation, modelling, or methods of machine learning or artificial intelligence such as neural networks, SVM methods (SVM—support vector machine), deep learning, KNN (artificial neural networks), or regression as well as image processing methods. Adjusting the visual range by machine learning permits the visual range to be adjusted more accurately and enables larger volumes of data to be processed.

One aspect of the invention also relates to a visual range collecting device. The visual range collecting device has a visual range collection according to one aspect of the invention.

The visual range collecting device is preferably embodied as a server or so-called backend.

Advantageous embodiments of the method according to the invention are to be regarded as advantageous embodiments of the visual range collecting device.

BRIEF DESCRIPTION OF THE DRAWINGS

Further features of the invention emerge from the claims, the figures and the description of the FIGURES.

Exemplary embodiments of the invention are explained in more detail below with the aid of a schematic drawing. The FIGURE shows an exemplary embodiment of a method according to the invention for generating a visual range collection.

The FIGURE shows a motor vehicle at a current position on a roadway.

DETAILED DESCRIPTION OF THE PRESENTLY PREFERRED EMBODIMENTS

The FIGURE shows a motor vehicle 1 at a current position 2. The motor vehicle 1 is on a roadway 3.

According to an exemplary embodiment, motor vehicle 1 has at least one environment sensor, preferably a camera, a radar sensor, an ultrasound sensor, a LiDAR, or a laser scanner. The motor vehicle 1 determines a current visual range 4, in particular by the environment sensor. The visual range 4 describes how far a driver of the motor vehicle 1 can see the roadway 3 ahead. The visual range 4 can be determined, for example, with a radar sensor, by determining which distance the visual range 4 is equivalent to, on the basis of the transit time of the radar signal. The radar signal is reflected back, for example, by the visual obstruction 5, and the visual range 4 can be determined. The visual range 4 is, for example, 80 m or 250 m. The visual obstruction 5 is in the form of, for example, as vegetation 6 or building density 7.

The current position 2 is preferably determined by a global navigation satellite system (GNSS).

The motor vehicle 1 thus determines the visual range 4 at the position 2 and transmits the visual range 4, in particular together with the position 2, and in particular together with the orientation of the motor vehicle 1, and in particular with the direction of travel of the motor vehicle 1, to a visual range collecting device 8. The visual range collecting device 8 is embodied, at least in an exemplary embodiment, as a server or a so-called backend. The visual range collecting device 8 can be present centrally or as a distributed system.

According to an exemplary embodiment, a visual range collection 9 is generated in the visual range collecting device 8. According to an exemplary embodiment, the visual range collection 9 is available as a database. The database is preferably embodied as a relational database, which stores the visual range 4 together with the position 2 and further meter data such as, for example, acquisition time, a quality value 10 and an acquisition date.

Depending on a quality value 10, the visual range 4 is replaced by a further visual range 11. The further visual range 11 according to an exemplary embodiment is younger (newer) than the visual range 4. If the quality value 10 of the further visual range 11 is now greater than a quality threshold value or greater than the quality value 10 of the visual range 4, the visual range 4 is replaced with the further visual range 11. If this is not the case, for example, the visual range 4 is not replaced by the further visual range 11, but rather the further visual range 11 is, for example, discarded or stored in some other way.

According to an exemplary embodiment, an expected change 12 in visual obstruction is predetermined. The change 12 in visual obstruction describes how the visual obstruction 5, that is to say, for example, the vegetation 6 or the building density 7, is likely to change. The change 12 in visual obstruction can therefore be predicted, for example, on the basis of a probability of a future development of the vegetation 6 or of the building density 7. For example, it can be assumed that a corn field as the vegetation 6 is higher shortly before the harvest time in late summer than shortly after sowing or after the harvest. In the case of building density 7, it can also be assumed that a construction site has a lower structure at the beginning than is the case, for example, at the end of the construction phase. In the event of a demolition phase, it is the opposite, for example it is common for the structure to become lower from time to time during the demolition phase and thus for the visual range 4 to increase again, since the building density 7 is no longer present as the visual obstruction 5.

The visual range from the visual range collection 9 is adjusted or corrected on the basis of the expected change 12 in visual obstruction. The visual range can be adjusted, for example, in the visual range collecting device 8, or else the visual range 4 is adjusted outside the visual range collecting device 8.

The visual range 4 is transmitted to a further motor vehicle 13, in particular after the adjustment as a result of the change 12 in visual obstruction. The further motor vehicle 13 can then, for example, carry out an overtaking maneuver 14 more accurately than would have been the case without the visual range 4.

It may also be the case that the visual range 4 is transmitted to the further motor vehicle 13 and the adjustment of the visual range 4 takes place in the further motor vehicle 13 itself. It may also be the case that only one correction value, that is to say the change 12 in visual obstruction itself, is transmitted to the further motor vehicle 13 and the visual range 4 from the further motor vehicle 13 is available, so that the visual range 4 itself does not have to be transmitted to the further motor vehicle 13 each time, but only the change 12 in visual obstruction is transmitted.

According to an exemplary embodiment, not only is a visual range determined, but a number of visual ranges are determined at different positions by means of a swarm of vehicles 15. This multiplicity of visual ranges 4 is then transmitted to the visual range collecting device 8 and added to the visual range collection 9 there.

According to an exemplary embodiment, the adjustment of the visual range 4 on the basis of the change 12 in visual obstruction is carried out with machine learning. The change 12 in visual obstruction can already be predetermined by machine learning or on the basis of mass data (big data).

For example, map matching, learning of the quality threshold value or calculation of correction factors or calculation of the change 12 in the visual obstruction are then carried out in the visual range collecting device 8.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for generating a visual range collection, comprising:
   determining a current position of at least one motor vehicle;
   determining a current visual range that describes how far a driver of the at least one motor vehicle can see ahead along a roadway from the current position;
   transmitting the current visual range from the at least one motor vehicle to a visual range collecting device;
   generating the visual range collection based at least in part on the transmitted current visual range;
   predetermining an expected change in visual obstruction at the current position due to a vegetation-cycle-dependent change in visual obstruction; and
   adjusting a visual range from the visual range collection based at least in part on the predetermined change in visual obstruction.

2. The method as claimed in claim 1, wherein
   a change in vegetation at the current position is predetermined as the change in visual obstruction, and the current visual range in the visual range collection is adjusted based at least in part on the change in vegetation.

3. The method as claimed in claim 1, further comprising:
   determining a quality value for the current visual range, wherein the quality value describes a current environmental status of the at least one motor vehicle while the current visual range has been determined, and the quality value is stored with the current visual range in the visual range collection.

4. The method as claimed in claim 3, further comprising:
replacing the current visual range in the visual range collection by a further visual range in accordance with the quality value.

5. The method as claimed in claim 1, further comprising:
transmitting a current adjusted visual range from the visual range collection to a further motor vehicle.

6. The method as claimed in claim 5, wherein
the further motor vehicle performs an overtaking maneuver in accordance with the visual range.

7. The method as claimed in claim 1, wherein
the visual range collection with respective visual ranges is generated by a swarm of vehicles with a plurality of motor vehicles.

8. The method as claimed in claim 1, wherein
the visual range in the visual range collection is adjusted by machine learning.

9. The method as claimed in claim 1, wherein
the visual range in the visual range collection is adjusted based at least in part on rules that use data from weather databases.

10. A method for generating a visual range collection, comprising:
determining a current position of at least one motor vehicle;
determining a current visual range which describes how far ahead a driver of the at least one motor vehicle can see on a roadway from the current position;
transmitting the current visual range from the at least one motor vehicle to a visual range collecting device;
generating the visual range collection based at least in part on the transmitted current visual range;
predetermining an expected change in visual obstruction at the current position based at least in part on a change in building density; and
adjusting a visual range from the visual range collection based at least in part on the predetermined change in visual obstruction.

11. The method as claimed in claim 10, wherein
a change in building density at the current position is predetermined as the change in visual obstruction, and the current visual range in the visual range collection is adjusted based at least in part on the change in building density.

12. The method as claimed in claim 10, further comprising
determining a quality value for the current visual range,
wherein the quality value describes a current environmental status of the at least one motor vehicle while the current visual range has been determined, and the quality value is stored with the current visual range in the visual range collection.

13. The method as claimed in claim 10, wherein
the visual range collection with respective visual ranges is generated by a swarm of vehicles with a plurality of motor vehicles.

14. A visual range collecting device with a visual range collection, comprising:
a server;
a receiver; and
a transmitter,
the visual range collection, stored as a database on the server, is generated by:
determining a current position of at least one motor vehicle by a global navigation satellite system;
determining a current visual range by at least one environment sensor, which describes how far ahead a driver of the at least one motor vehicle can see on a roadway from the current position;
transmitting the current visual range from the at least one motor vehicle to the receiver of the visual range collecting device;
generating the visual range collection based at least in part on the transmitted current visual range;
predetermining an expected change in visual obstruction at the current position based at least in part on a change in the building density; and
adjusting a visual range from the visual range collection based at least in part on the predetermined change in visual obstruction.

15. The visual range collecting device of claim 14, wherein the at least one environment sensor is one or more of a camera, a radar sensor, an ultrasound sensor, a LiDAR, and a laser scanner.

* * * * *